(12) United States Patent
DeRay

(10) Patent No.: US 10,196,239 B1
(45) Date of Patent: Feb. 5, 2019

(54) TREE HOUSE ELEVATOR

(71) Applicant: John Barry DeRay, Davenport, FL (US)

(72) Inventor: John Barry DeRay, Davenport, FL (US)

(*) Notice: Subject to any disclaimer, the term of this patent is extended or adjusted under 35 U.S.C. 154(b) by 0 days.

(21) Appl. No.: 15/530,017

(22) Filed: Nov. 21, 2016

(51) Int. Cl.
  *B66F 1/00* (2006.01)
  *B66B 9/00* (2006.01)
  *A01M 31/02* (2006.01)
  *B66B 11/00* (2006.01)

(52) U.S. Cl.
  CPC .............. *B66B 9/00* (2013.01); *A01M 31/02* (2013.01); *B66B 11/0035* (2013.01)

(58) Field of Classification Search
  CPC .......... A01M 31/02; B66B 9/00; B66B 9/187; B66B 15/02; B66B 15/06; E04G 3/32; E04G 3/325; A45F 3/26; A63B 27/00
  USPC ........................................................ 182/187
  See application file for complete search history.

(56) References Cited

U.S. PATENT DOCUMENTS

| | | | | |
|---|---|---|---|---|
| 1,751,131 A * | 3/1930 | Costello | ..................... | E04G 3/32 182/113 |
| 2,121,134 A * | 6/1938 | Torner | ..................... | B66C 21/00 212/92 |
| 3,262,518 A * | 7/1966 | Webb | ....................... | A62B 1/02 182/191 |
| 3,907,066 A * | 9/1975 | Newton | ..................... | E04G 3/24 182/112 |
| 4,474,263 A * | 10/1984 | Christopher | .............. | B66B 9/00 182/10 |
| 4,593,789 A * | 6/1986 | Treants | .................. | A01M 31/02 105/152 |
| 4,630,542 A * | 12/1986 | Peyre | ..................... | B66C 13/02 104/112 |
| 5,090,666 A * | 2/1992 | May | ....................... | B66D 1/7415 254/329 |
| 5,803,694 A * | 9/1998 | Steele | ..................... | B66D 1/605 135/901 |
| 5,862,827 A * | 1/1999 | Howze | ................. | A01M 31/025 135/140 |
| 6,079,517 A * | 6/2000 | Payne | .................... | A01M 31/02 182/133 |
| 6,095,284 A * | 8/2000 | Smith | .................... | A01M 31/02 182/103 |
| 6,471,269 B1 * | 10/2002 | Payne | .................... | A01M 31/02 294/99.1 |
| 6,533,070 B1 * | 3/2003 | Elrod | ..................... | E06C 1/345 182/103 |
| 7,168,522 B1 * | 1/2007 | Price | .................... | A01M 31/025 135/901 |
| 7,485,032 B1 * | 2/2009 | Hogue | ..................... | A22B 5/06 452/187 |
| 7,857,098 B2 * | 12/2010 | Yeary | .................. | A01M 31/025 135/90 |
| 7,909,139 B2 * | 3/2011 | Blue | ..................... | A01M 31/02 182/103 |
| 9,073,734 B1 * | 7/2015 | Cates | .................... | B66C 23/203 |
| 9,527,712 B1 * | 12/2016 | Pigg | ...................... | A01M 31/02 |

(Continued)

*Primary Examiner* — Daniel P Cahn

(57) ABSTRACT

This elevator provides a travelling system between the ground and a higher level, such as a tree limb, in places where guide rails, towers or other structures may be impractical. The elevator has a pipe body which is stabilized by, and rides on, a cable or rope guide.

3 Claims, 2 Drawing Sheets

(56) References Cited

U.S. PATENT DOCUMENTS

| | | | | |
|---|---|---|---|---|
| 2003/0178251 A1* | 9/2003 | Hewitt | .................. | A01M 31/02 |
| | | | | 182/63.1 |
| 2003/0228838 A1* | 12/2003 | Gearhart | .................. | A22B 5/06 |
| | | | | 452/187 |
| 2008/0087497 A1* | 4/2008 | Boswell | .................... | A62B 1/02 |
| | | | | 182/142 |
| 2008/0185564 A1* | 8/2008 | LaFreniere | .............. | B66D 3/18 |
| | | | | 254/342 |
| 2008/0271948 A1* | 11/2008 | Motes | .................. | A01M 31/02 |
| | | | | 182/141 |
| 2013/0056695 A1* | 3/2013 | Cazzaro | .................. | A62B 1/14 |
| | | | | 254/371 |
| 2015/0014095 A1* | 1/2015 | King | ...................... | E04G 3/325 |
| | | | | 182/129 |

\* cited by examiner

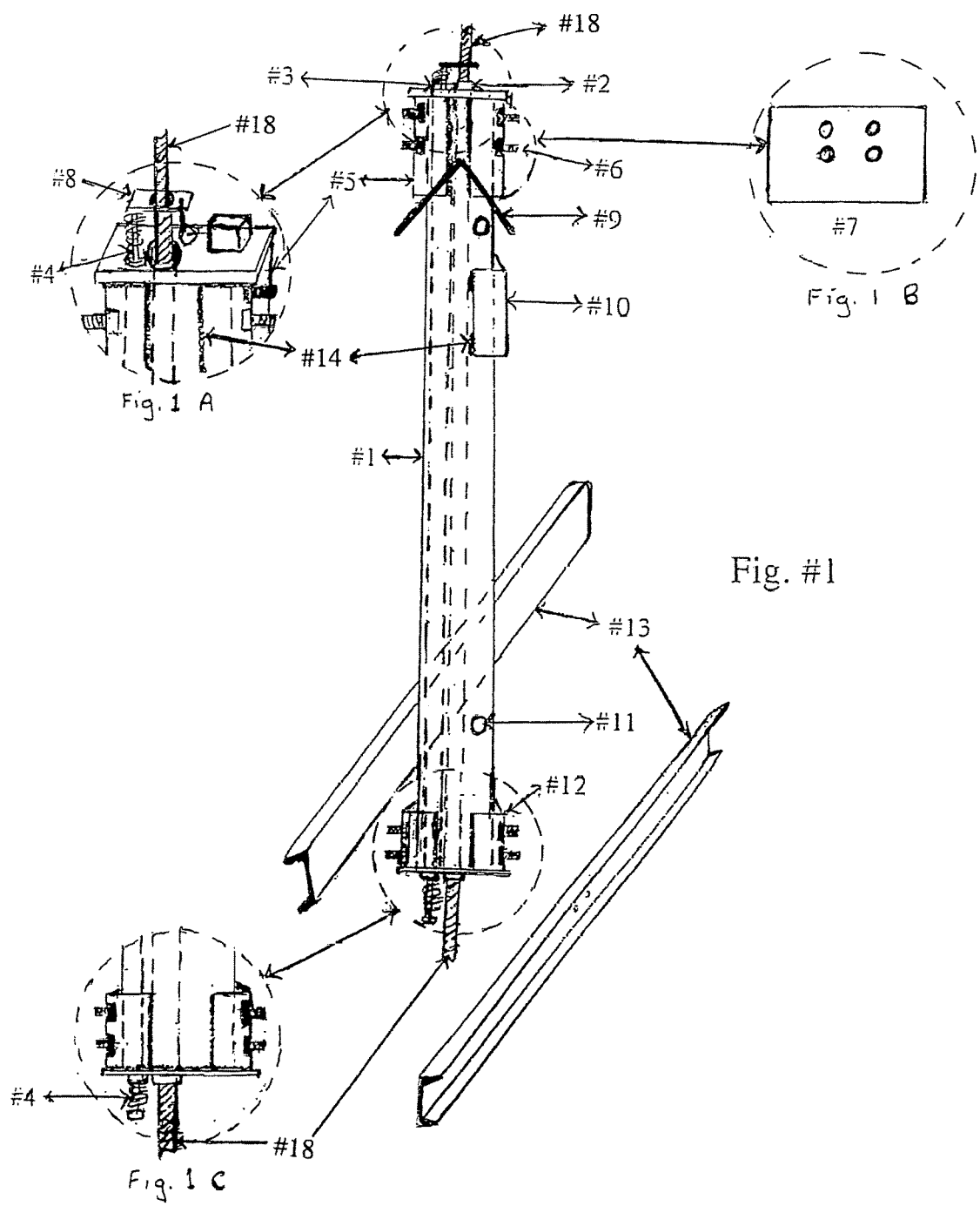

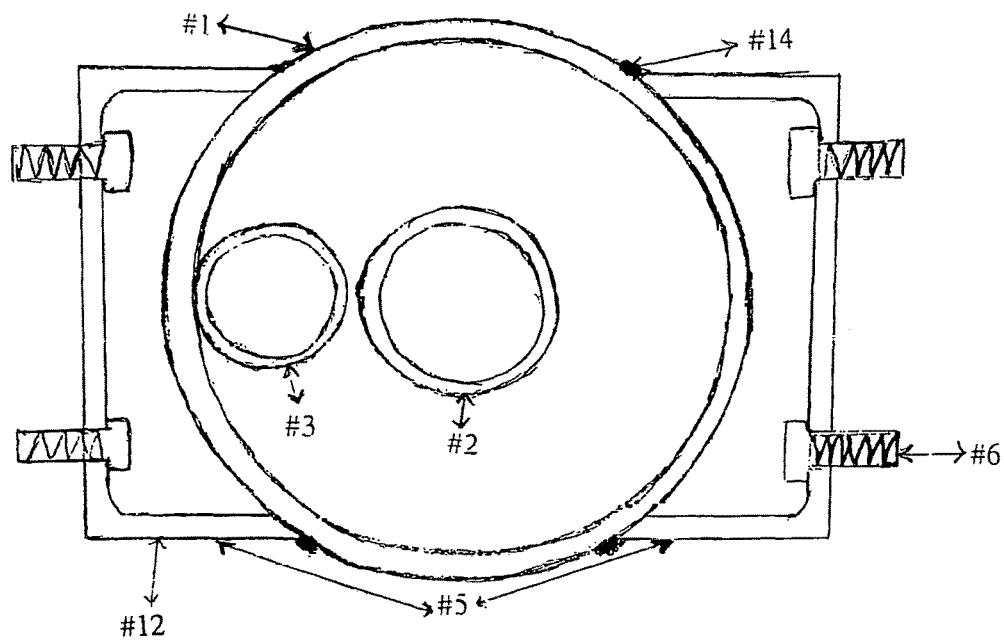
Fig. #2
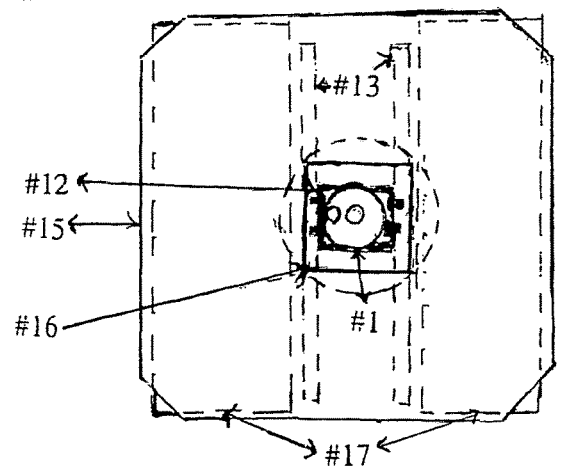
Fig. #3

TREE HOUSE ELEVATOR

SUMMARY OF THE INVENTION

This raising and lowering device (elevator) is an inexpensive means of travel in a substantial vertical direction. It utilizes a single cable or rope guide which keeps it stable at all times during travel and also while parked or stopped. It utilizes on board winches, battery powered, to provide ascending lift and descending lowering. The upper connecting point can be a substantial tree limb or manufactured connecting device. Ground connection can be an eye bolt, rebar or other device to which the guide cable or rope can be attached in a permanent fashion. The winch mounts are at the top of the pipe body and therefore the pick point is always from the top, which increases stability. The platform which can be metal or wood lands on foam rubber which attaches to the underside of the platform. This buffer material can also be incorporated into the ground to absorb the impact of any unforeseen malfunction. The ground landing softening methods which can be used are not apportioned to this application. This tree house elevator can also be used as a lifting device for other purposes such as a hunters perch. It utilizes 12 or 24 volt current from batteries, house current winches are also available so the elevator could also be used as a porch lift. The winches which attach directly to the top mount of the pipe body and the platform bolts to the bottom, that is the lower mounts on the pipe body. The elevator follows the cable or rope guide attached to ground and a tree limb or roof mount which stabilizes the unit. The pipe body is a 3" aluminum pipe with welded 3" aluminum channels fabricated to receive winches and platform. The device can be used with wired or wireless control function according to the winches selected by the user. These winches do not require any specialty tools to install. My planed kit will include the aluminum prefabricated pipe and channel device being called the pipe body. To this pipe body the winches and the platform support stiles (cross members) will bolt to. This pipe body also incorporates a control station mount, wire ports, guide cable pipe housing, limit switch actuated by an up and down limit rod in a pipe housing to control and limit travel. All of these components make up the pipe body of this tree house elevator.

PART LIST

1—is a 3" Aluminum pipe and wiring duct (This is the main component of the pipe body)
2—Guide for stabilizing cable or rope (¾ to 1' aluminum pipe)
3—Limit switch rod (aluminum pipe housing)
4—Limit sw rod also showing spring
5—Winch mount channel welded to pipe
6—Machine Bolts ⅜×1" 8 required (upper for winches, lower for platform support styles
7—Winch mount template (Shown at 90 degree angle on drawing)
8—Limit sw activator mechanism
9—Handgrip and lanyard attachment (2 each)
10—Car station mount channel
11—Wire ports 4 required
12—Platform mounts (welded to pipe)
13—Platform support stiles (3"×45" aluminum channels (Bolt to platform mounts)
14—Depicts numerous welds
15—Plywood floor
16—Square hole in center of plywood floor
17—Lower mounting brackets and foam buffer material
18—Guide cable or rope

BRIEF DESCRIPTION OF THE DRAWINGS

FIG. 1 is the aluminum pipe body diagram. Partial perspective view, including an expanded view showing limit switch rod; an expanded view of the lower end of the limit switch rod and a detailed of the winch template.

FIG. 1A is an expanded view at the top of the pipe body.

FIG. 1B is a side perspective with respect to FIG. 1, representing a template for the hole pattern of the winch mounts welded to the pipe body.

FIG. 1C is an expanded view of the bottom of the pipe body.

FIG. 2 is a top view of the pipe body, winch and platform mount brackets. It is also an expanded view of the center portion of FIG. 3.

FIG. 3 is the top view looking down at the platform and showing the platform and cross members which are 3"×45" aluminum channels.

DETAILED DESCRIPTION OF THE DRAWINGS

FIG. 1 shows the 3" aluminum pipe, it also shows the platform and winch mounts, it is a partial perspective view. Wood platform not shown. This is the tree house elevator in kit form, batteries not included. Charging system winches, cable or rope and plywood provided by others, FIG. 2 is a top view of winch and platform mount brackets. Mounts are identical except in depth. This is an expanded view of the center of FIG. 3. Cable guide pipe #2 (the cable is not shown can vary considerably, from rope to stainless steel). Limit rod pipe #3 that guide, incorporates or houses a ⅜ inch stainless steel rod as shown in FIG. 1 but now shown on this diagram. Both pipe guides top and bottom are welded in place to aluminum fabricated caps which are not detailed or shown in this diagram. The 3" aluminum pipe body is also used as a wiring raceway. Pipe body can vary in length to suite users, should be 5 or 7 feet in height. This top view diagram FIG. 2 is near to actual size.

Recommended Assembly Instructions

1 Using the winch template provided, drill holes in the winch mount plate to match winches and mount (attach winches to the top on the pipe body).

2 From a ⅝" high grade water resistant plywood 4 feet×4 feet, cut a 6"×6" square hole in center.

3 Place pipe body through the 6 inch hole and attach the platform cross members under the plywood floor to the lower mounting brackets.

4 Square plywood floor on stiles and attach with 1½"× 5/16" carriage bolts. The holes must be drilled, 8 bolts evenly spaced recommended.

5 Feed battery wires through pipe body ports to winch solenoid as necessary, according to the winch instructions.

6 Mount winches, note: winches have their own wiring and instructions, follow those instructions.

7 Feed limit rod from top to bottom and through upper spring assembly, and through pipe body. Now attach lower spring assembly and collar, then attach limit switch to top mount cap.

Your elevator is assembled, now the unit must be attached to a tree limb using cable or rope, and the bottom to ground, such as a U shaped reinforcing rod in a post hole. You dig into the ground about 3 feet to contain about ¼ yard of concrete. This concrete should be 6" below the ground level in order to soften ground under platform.

8 Hole in ground about 2 feet in diameter. 3 feet deep, plumb drop or drop plumb (same thing) from tree limb to ground and dig hole to form anchor.

9 Pour concrete into hole with U shape rebar or equivalent and then let concrete cure.

10 Place and clamp guide cable to tree mount (top mount) along with winch cable, but about 4" to 8" apart.

11 Raise elevator using attached winch. Attach and clamp to ground mount and you are mechanically operable.

12 One or two winches can be mounted to the winch mount pole, or put a pulley on top mount then back to mount pole.

13 Wiring is according to winch instructions.

14 During operation, make sure your cables do not tangle or cross and ride evenly on winch drum. Adjust as necessary.

15 Additional material ground softening buffer can be incorporated into ground where elevator lands.

The invention claimed is:

1. A kit for at least a tree house elevator, the kit comprising:
   (a) a pipe body comprising a 3 inch aluminum pipe with a cable guide pipe passing through an entire major length of the 3 inch aluminum pipe, wherein the 3 inch aluminum pipe is configured to be stabilized by said cable guide pipe;
   (b) a rope or a cable running through the cable guide pipe, wherein the rope or cable is configured to be attached between a ground surface and an upper connecting point, including a tree limb;
   (c) two winch mount channels welded to a top portion of the pipe body, each of said winch mount channels comprising 4 machine bolts each being 3/8 inch by 1 inch, wherein said winch mount channels are configured to be attached to lifting devices or winches with said machine bolts;
   (d) two lower platform channel mounts welded to a bottom portion of the pipe body;
   (e) two platform support cross members configured to be bolted to the two lower channel mounts, respectively;
   (f) a platform configured to be bolted onto the two platform support cross members;
   (g) a limit switch, capable of being actuated by a limit rod in a pipe housing of the pipe body;
   (h) a control mount channel welded to a portion of the pipe body, wherein the kit is configured to accept universal winches equipped with control devices, and the control mount channel is configured to receive the control devices;
   (i) a lanyard attachment welded to a lower portion of at least one of the winch mount channels of the pipe body.

2. The kit having the tree house elevator as recited in claim 1, further comprising the platform support stiles respectively being 3 inch by 45 inch aluminum channels.

3. The kit having the tree house elevator as recited in claim 1, further comprising a foam buffer material.

\* \* \* \* \*